Aug. 7, 1928.
1,679,691
W. P. SMITH
PULLEY
Filed July 18, 1927
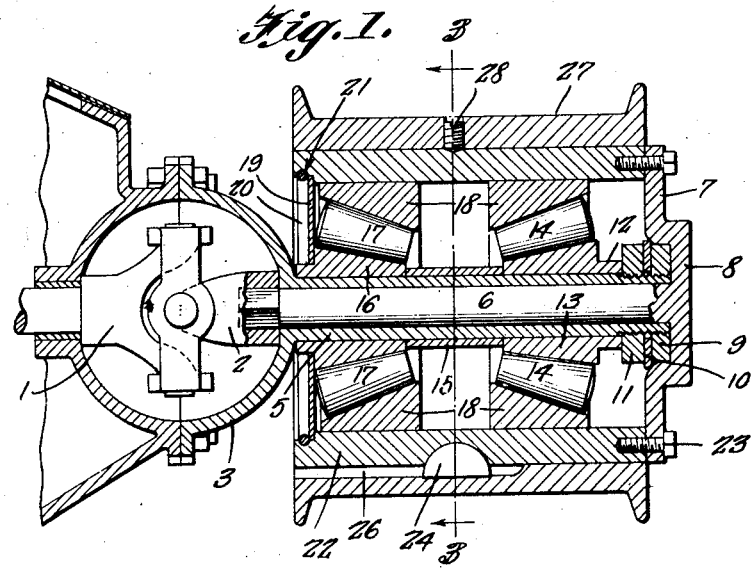
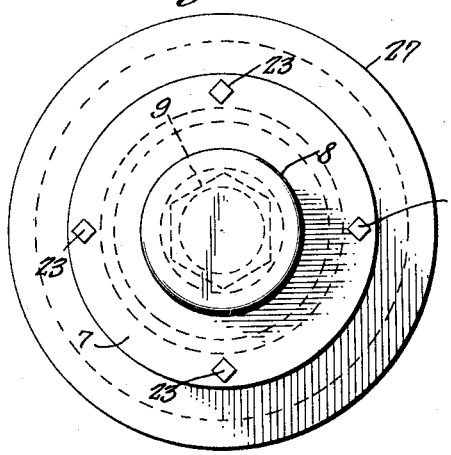 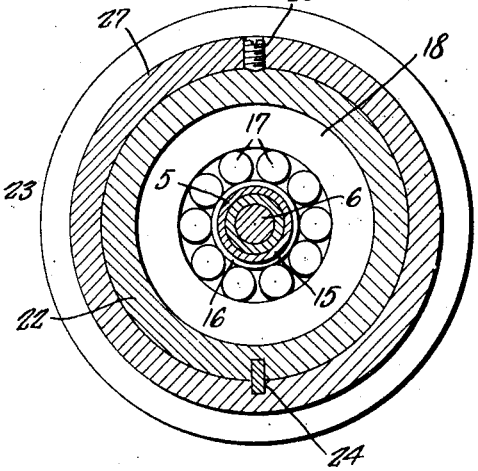
William P. Smith,
INVENTOR
BY Victor J. Evans
ATTORNEY
WITNESS:

Patented Aug. 7, 1928.

1,679,691

UNITED STATES PATENT OFFICE.

WILLIAM P. SMITH, OF CAPRON, VIRGINIA.

PULLEY.

Application filed July 18, 1927. Serial No. 206,606.

My present invention has reference to a pulley designed to be connected to any motor that has a ball and universal joint, such for instance, as the universal joint between the engine and drive shafts of an automobile, so that either a disconnected or disused type of such machines may be successfully employed as a stationary motor for driving suitable machinery that is hitched to the pulley.

A further object is the provision of a pulley for this purpose which has anti-frictional bearings of a type to insure the free turning thereof, and that has removable rims, whereby the cross sectional diameter of the pulley may be increased or decreased as occasion requires.

To the attainment of the above broadly stated objects and others which will present themselves as the nature of the invention is better understood, the improvement further resides in certain other novel features of construction, combination and operative association of parts, one satisfactory embodiment of which is disclosed by the accompany drawings.

In the drawings:

Figure 1 is a substantially central longitudinal sectional view through the improvement.

Figure 2 is an end view thereof.

Figure 3 is a sectional view approximately on the line 3—3 of Figure 1.

In Figure 1 of the drawings, there is illustrated a housed universal joint 1 of the type employed between the drive and the driven shafts of an automobile or like motor. The socket element of the universal joint is for distinction indicated by the numeral 2.

In carrying out my invention I disconnect the outer half of the housing for the universal joint, that is the portion thereof through which the driven shaft passes, and bolt to the section of the housing that remains with the motor a housing section 3 that is provided with a sleeve extension 5. As a matter of fact, the housing section 3 may be that usually employed, in which instance, the sleeve 5, which originally provides the housing for the wheel drive for the driven shaft is cut away and has its outer end threaded.

Passed through the sleeve 5 and having a squared end received in the socket 2 there is a shaft 6. This shaft has an outer disc head 7, and the central portion of the head is bulged outwardly, as at 8, to provide a pocket for a nut 9 that is screwed on the threaded end of the sleeve 6. This nut contacts with the spacer element or washer 10 and with a second nut 11 that is also screwed on the sleeve. The nut 11 abuts one end of the hub portion 12 of a conical raceway element 13 for conical bearings 14. The member 13 has its inner end contacted by a collar or bushing 15 that surrounds the sleeve 5, and this collar also contacts with the inner end of a second raceway or bearing member 16 or other conical rollers 17. The hub portion of the member 16 contacts with the housing 3. The outer elements that provide the bearings for the rollers 14 and 17 are in the nature of comparatively wide rings 18, the said rings having inner flared or cone-shaped bores, as clearly disclosed by Figure 1 of the drawings. The bearing members 16 and 18 are held in contacting engagement with the collar 15 through the medium of a disc 19 that is held against the member 16 through the medium of a split spring ring 20 that is received in an annular groove 21 in the outer peripheral member or felly 22 of the pulley. The head 7 for the shaft 6 is secured to the felly member 22 through the medium of bolts 23, as clearly disclosed by the drawings.

The member 22 is provided with a depression whose inner wall is preferably circular and which provides a pocket for a key 24. The key is designed to be received in a groove or key-way 26 on the inner face or bore of a removable rim 27. The rim is thus locked to the pulley so that the same will turn with the pulley, and the rim is held from longitudinal movement on the pulley through the medium of a removable element 28 that is preferably in the nature of a headless screw and which enters a depression in the outer or peripheral member 22 of the pulley.

The simplicity of my construction and the advantages thereof will be, it is thought, understood and appreciated by those skilled in the art to which such invention relates without further detailed description. It is to be noted that the head 7 of the shaft 6 being locked to the peripheral member 22 will cause the end member, and the rim thereon to revolve with the shaft. The outer bearing members 18 are preferably fixed to the peripheral member 22 to revolve therewith, but the inner bearings or raceways for the roller bearings are locked on the sleeve and as the sleeve is stationary, are, of course, held from turning.

Having described the invention, I claim:—

1. In a device for the purpose set forth, a shaft designed to be driven by a motor and having an outer headed end, a fixed sleeve surrounding the shaft, spaced bearing members fixed on the sleeve, an elongated ring member providing a felly surrounding the bearing members, bearing members carried by the felly, and affording a race-way with the first mentioned bearing members, anti-frictional elements in the race-ways, means connecting the head of the shaft with the felly and a removable rim fixed on the felly.

2. In a pulley as herein described, a shaft designed to be driven by a motor and having an outer headed end, a fixed sleeve surrounding the shaft, spaced sectional bearings removably fixed on the sleeve, a felly removably connected to the head of the shaft, and having inwardly directed bearings thereon, anti-frictional rollers between the first and second mentioned bearing members, means on the sleeve spacing the first mentioned bearing members, means on the felly holding one of the first mentioned bearing members on the sleeve, and a removable rim fixed on the felly.

3. In a pulley as herein described, the combination with a motor and a universal joint that includes a socket and a sectional housing therefor, of a shaft having one of its ends headed and its second end received in the socket, a sleeve surrounding the shaft and having a housing section secured to the first mentioned housing section, bearing members providing inner elements of a raceway arranged on the sleeve, means on the sleeve spacing the bearing members and securing the same to the sleeve, a comparatively wide ring member providing a felly, removable means securing the felly to the head of the shaft, bearing members providing the second elements of the race-ways carried by the felly, frusto conical bearing rollers in the raceways, removable means on the felly enclosing the bearings, said felly having a key removable thereon, and a rim having a key-way receiving the key therein, and removable means locking the rim on the felly.

In testimony whereof I affix my signature.

WILLIAM P. SMITH.